Aug. 15, 1961         B. C. PRATT         2,996,710
ELECTROMAGNETIC RADIATION-ABSORPTIVE ARTICLE
Filed Sept. 20, 1945
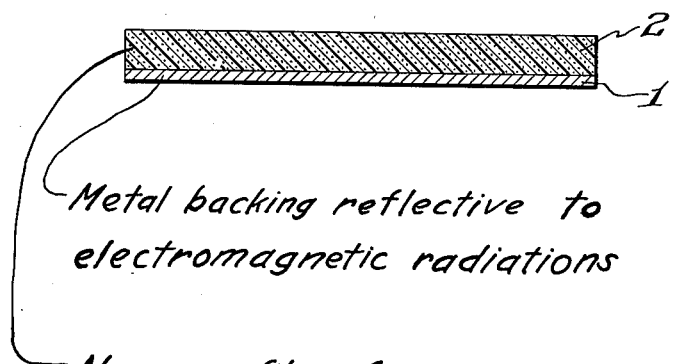
Metal backing reflective to electromagnetic radiations
Neoprene film of predetermined thickness containing 8% to 50% by volume of powdered carbon of absolute density less than 3
INVENTOR.
Bent Carlton Pratt United States Patent Office 2,996,710
Patented Aug. 15, 1961

2,996,710
ELECTROMAGNETIC RADIATION-ABSORPTIVE ARTICLE
Burt Carlton Pratt, Wilmington, Del., assignor to E. I. du Pont de Nemours and Company, Wilmington, Del., a corporation of Delaware
Filed Sept. 20, 1945, Ser. No. 617,693
3 Claims. (Cl. 343—18)

This invention relates to electromagnetic radiation-absorptive articles, and more particularly to such articles having improved properties and to a process for making them.

In various applications of electromagnetic radiations, it is desirable to alter the reflectivity of metallic or other objects for ultra-high frequency radio waves which strike their surface. More specifically, it is often desirable to reduce the reflectivity of an article for electromagnetic radiations having a given frequency within the range of $10^7$ to $10^{11}$ cycles/second, to the point where such radiations striking the article are substantially all absorbed. The methods which have hitherto been proposed for accomplishing this purpose involve attaching to the surface of the radiation-reflective article a metallic flake-pigmented film of predetermined thickness, or interposing between the radiation-reflective article and the source of radiations an electromagnetic radiation-absorptive element composed of a metallic flake-pigmented film of predetermined thickness joined to a metal foil backing. In some instances the use of metal-pigmented films in these ways is satisfactory from the standpoint of the electrical properties of the articles produced but there are several disadvantages associated with the preparation of such films and with their physical properties. Among these disadvantages are the following: Electromagnetic radiation-absorptive characteristics of films prepared from metal-pigmented compositions which are subjected to a milling operation are quite sensitive to the duration of the milling treatment, i.e., the electrical characteristics are excessively changed by extremely short variations in the length of time the pigmented composition is milled. Metal pigments such as fine aluminum flake have the serious tendency of being dispersed in air as a dust during the milling operation, this resulting in undesirable health and explosion hazards. Metal pigments, except for certain special types which are relatively expensive, are also subject to corrosion, e.g., by salt water, and such corroded pigments impart undesirable electrical properties to the radiation-absorptive article. Furthermore, the metallic flake pigments have no reinforcing action on film-forming composition; in fact, such pigments detract from the physical strength of films containing them, especially when they are used in the high proportions necessary for many electro-magnetic radiation-absorptive applications.

This invention has as an object a new type of electromagnetic radiation-absorptive article. Another object is an article of this kind which is highly resistant to corrosion. A still further object is a process for producing such articles which is less hazardous and less critical with respect to operating conditions than processes heretofore known. Other objects will appear hereinafter.

These objects are accomplished by the preparation of an article having a low order of reflectivity to ultra-high frequency radio waves by a method which comprises joining to a backing member, which reflects substantially all of said radio waves, a neoprene film of predetermined thickness of at least 25 mils containing 8 to 50% by volume of a form of powdered carbon having an absolute density of less than 3.

The single figure in the drawing is a view in section of an electromagnetic radiation-absorptive article made in accordance with the practice of my invention.

The metal backing 1, which reflects essentially all electromagnetic radiations striking it, is joined, on the surface facing the source of radiations, to the electromagnetic radiation-absorptive film 2. This film 2 is composed of a neoprene of predetermined thickness of at least 25 mils having dispersed therein 8% to 50% by volume thereof of powdered carbon having an absolute density of less than 3.

The invention is carried out by uniformly incorporating into neoprene an amount of powdered carbon having a density of less than 3 within the range of 8 to 50% by volume of the total solids, forming a film of predetermined and uniform thickness from this carbon-pigmented composition, and joining the resulting film to a backing material, e.g., a metal foil, which reflects ultra-high frequency radio waves, e.g., electro-magnetic radiations having a frequency within the range of $10^7$ to $10^{11}$ cycles/second. Articles produced by this process are particularly effective in absorbing electromagnetic radiations having a frequency within the above-specified range which strike the surface of the carbon-pigmented film.

The invention is illustrated in greater detail by the following examples in which the proportions of the ingredients are expressed as parts by weight unless otherwise specified.

Example I

| Ingredients | Parts by Weight | Percent by Volume |
| --- | --- | --- |
| Polymeric 2-chloro-1,3-butadiene (known commercially as neoprene) | 36.1 | 48.1 |
| Graphite (having a density of 2.25) | 20.0 | 14.8 |
| Semi-Reinforcing Furnace Black (having a density of 1.8) | 18.01 | 17.0 |
| Calcium Carbonate | 18.05 | 11.1 |
| Phenyl-α-naphthylamine | 0.7 | 1.0 |
| Zinc Oxide | 1.8 | 0.5 |
| Light Calcined Magnesia | 1.5 | 0.7 |
| Stearic Acid | 0.2 | 0.3 |
| High Melting Wax | 1.8 | 3.3 |
| Petroleum Hydrocarbon Oil | 1.8 | 3.2 |
| Total | 100.0 | 100.0 |

The above ingredients are mixed in a rubber mill until homogeneous and the resulting mix calendered at 48° C. into a film 38 mils (0.038 inch) thick. After curing, this film has a tensile strength and an elongation (at break) of 960 lbs./sq. in. and 160%, respectively. After cutting the calendered film into 10 inch squares, four squares are placed on a 10 inch square of uncoated aluminum foil 2 mils thick, the three bottom films being placed so that the orientation (direction of calendering) of each is parallel to the others, and the fourth film being placed on top with its orientation at right angles to that of the lower three. The assembly is pressed in a hydraulic press (a sheet of cellophane being placed between the top film and the press to prevent its sticking to the press) at 140° C. for ½ hour with shims of 163 mils thickness between the platens of the press. After cooling under pressure to 30° C., the foil-backed film is removed from the press. The combined film has a thickness of 145 mils. The foil-backed article absorbs substantially all electromagnetic radiations having a frequency of about $3 \times 10^9$ cycles/second which strike the surface of the carbon-pigmented film.

Example II

| Ingredients: | Parts by weight |
|---|---|
| Polymeric 2-chloro-1,3-butadiene (known commercially as neoprene) | 150 |
| Phenyl-β-naphthylamine | 3 |
| Zinc oxide | 7.5 |
| Light calcined magnesia | 6 |
| Stearic acid | 0.75 |
| Semi-reinforcing furnace black (having a density of 1.8) | 84 |
| Xylene | 494 |

A neoprene cement is prepared from the above ingredients by the following procedure: The phenyl-β-naphthylamine, magnesia, zinc oxide, and carbon black are placed in a Banbury mixer and mixed at 43° C. for 3 minutes, whereupon the temperature is reduced to 35° C. and the neoprene is added. The mixer is closed and pressure is applied to the mixture in the mixer, whereupon the temperature rises to about 88° C. during 7 minutes. The mixing is continued for 5 minutes more with the temperature controlled at 88–93° C. by means of cooling water in the jacket of the mixer and by regulating the pressure on the mixture. The resulting mixture is removed and placed on a rubber mill where the zinc oxide is milled into the stock at room temperature. The resulting mill stock is cut into pieces approximately 1″ x ¾″ in size and placed in a container fitted with a paddle type stirrer witth about half the xylene. After stirring the mixture at room temperature for 2½ hours, the remainder of the xylene is added and stirring continued for an additional 5½ hours. The resulting solution, or cement, containing 33.7% (by weight) solids, is strained through cloth to remove any undissolved lumps. A composition suitable for knife coating is prepared from the above cement by mixing it with additional ingredients in the proportions below:

| Ingredients: | Parts by weight |
|---|---|
| Neoprene cement (33.7% solids) | 171 |
| Graphite | 12.6 |
| Toluene | 42 |

A uniform solution is obtained after these ingredients are tumbled in a closed container for 16 hours. This solution is spread on the surface of glass plates, previously coated with a 1 mil film of polyvinyl alcohol, by a spreader knife set at a clearance of 10 mils and allowed to dry at room temperature for 30 minutes. Nine additional coats are applied in the same manner, each succeeding coat being applied at right angles to the direction in which the previous coat was applied, and the knife setting being increased 5 mils for each successive coat. The resulting film, after drying overnight at room temperature, is removed from the polyvinyl alcohol-coated plate, seasoned at 70°C for 24 hours to remove solvent, and cured at 140° C. for one hour. The cured film, which contains 11.9% (by volume) of graphite and 22.7% (by volume) of semi-reinforcing furnace black is 20 mils thick. Three of these films are stacked on a brass plate and pressed firmly together. The assembly is found to absorb substantially completely electromagnetic radiations having a frequency of about $7.5 \times 10^9$ cycles/second.

While this invention has been illustrated with particular reference to graphite and semi-reinforcing furnace black as specific types of powdered carbon which have densities of 1.8 to 2.25, other types of powdered carbon having an absolute density of less than 3 can be employed in the practice of this invention. Examples of various types of powdered carbon which may be used include the different varieties of channel black known as easy, medium and hard processing, and conductive; the furnace blacks known as fine, conductive, high elongation and high modulus; acetylene black; the thermal black known as medium and fine; and graphite. The exact proportion of powdered carbon used (within the required range of 8 to 50% by volume of the film) depends generally on the specific type of carbon employed and the particular frequency of electromagnetic radiations which are to be absorbed by the film. Thus, for the lower frequencies within the specified range of $10^7$ to $10^{11}$ cycles/second, it is preferred to use the more effective types of carbons, e.g., graphite and acetylene black, in high proportions, e.g., 25 to 50% of the volume of the film. For the higher frequencies in this range, it is preferred to use the types of carbon of lower effectiveness, e.g., channel and furnace blacks in low proportions, i.e., 8 to 25% of the volume of the film. In some cases, it has been observed that mixtures of graphite or acetylene black with substantial amounts of the less effective carbon blacks are more efficient in absorbing radiations than an amount of graphite or acetylene black equal to the total amount of carbon in the mixture. The thicker films, the practical maximum of which is about 11 inches, are used in the case of the lower frequencies in the previously mentioned range.

The carbon-pigmented films of this invention can be prepared by spraying, calendering, or knifing. The method chosen should be one adapted to the particular vehicle, and it should be controlled with great care if films of the required very precise thickness and uniformity are to be obtained. In general, the calendering method is preferred for making thicker films, i.e., those of 50 to 250 mils thickness, while the spraying and knifing are preferred for making thinner films, i.e., films of 25 to 50 mils thickness. However, thick films can be prepared by spraying or knifing if desired.

The average thickness of these carbon-pigmented films, by whatever method prepared, should be adjusted carefully to that which will absorb the maximum amount of electromagnetic waves of the particular frequency expected to be encountered. Extreme care must also be taken to make the films as uniform in thickness as possible. For most radiation-absorption applications, the uniformity and average film thickness must be held to very close tolerances. The film uniformity must be within ±1.5% and the average thickness must be within ±0.5% of the predetermined value. This effect cannot be obtained by ordinary methods of coating.

The carbon-pigmented neoprene films of this invention may also include various auxiliary components such as fillers, plasticizers and roll-release agents. Among the various fillers which can be used are blanc fixe, lithopone, barytes, clay, and rutile, in addition to the calcium carbonate of the examples. The proportions of filler can be varied over wide limits depending on the physical properties desired in the final film. In general, amounts of filler ranging from 10% to 65% by volume of the film-forming polymer are employed. The plasticizers which can be used depend on the particular type of neoprene being used as the vehicle, the preferred plasticizers being those which are oxygen free, e.g., hydrocarbons, and halogenated hydrocarbons such as chlorinated diphenyl. When the carbon-pigmented composition is to be calendered it is usually desirable to include roll-release agents such as waxes and hydrocarbon oils. The hydrocarbon oils serve both as a roll-release agent and as a plasticizer.

This invention is not limited to the use of the specific radiation-reflective backing members disclosed in the examples. Any other material which reflects substantially all of the particular electromagnetic radiations within the range of $10^7$ to $10^{11}$ cycles/second which are intended to be absorbed by the composite article is suitable as the backing. In addition to aluminum foil and brass plates, foils, sheets, and plates of other metals, e.g., lead, silver, copper, steel, nickel, etc., are suitable. Likewise, fine mesh screens of metals such as these are also useful as the backing member. Silver paint having a high conductivity can also be applied to the carbon-pigment films as the backing member.

The examples have illustrated various methods for joining a preformed carbon-pigmented film to a radiation-reflective backing to form a radiation-absorptive article. However, this invention is not limited to these specific methods. The preformed carbon-pigmented film can be joined to the metal backing by pressure only, by the use of pressure and heat, or by the use of an adhesive, with sufficient pressure, with or without heat, to obtain uniform adhesion. The particular method employed depends on the particular vehicle used in the carbon-pigmented film, on the particular type of metal backing employed, and also on the particular application in which the radiation-absorptive article is to be used. When silver paint is employed as the backing material, it can be applied to the preformed carbon-pigmented film with or without a primer, or adhesive, coating. In still another modification, the carbon-pigmented film of predetermined thickness can be formed directly on the radiation-reflective backing, e.g., metal foil, screen or plate, which may or may not have a primer coat or adhesive on its surface, by such film forming methods as spraying, knifing, brushing, dipping and calendering.

The articles of this invention are effective in absorbing electromagnetic radiations having a frequency within the range of $10^7$ to $10^{11}$ cycles/second which strike the surface of the carbon-pigmented film. They are especially useful in such applications where the article is exposed to highly corrosive conditions and where superior physical properties are required.

As many apparently widely different embodiments of this invention may be made without departing from the spirit and scope thereof, it is to be understood that I do not limit myself to the specific embodiments thereof except as defined in the appended claims.

I claim:

1. An electromagnetic radiation-absorptive article having substantially no reflectivity to ultra high frequency electromagnetic waves, said article comprising a metallic backing essentially completely reflective to said electromagnetic waves, and a neoprene film which has a predetermined thickness of not less than about 25 mils and which has a thickness uniformity within ±1.5% and an average thickness within ±0.5% of said predetermined thickness attached to said backing, said film having uniformly incorporated therein from 8% to 50% by volume thereof of powdered carbon having an absolute density less than 3.

2. The electromagnetic radiation-absorptive article as set forth in claim 1 in which said powdered carbon is graphite.

3. The electromagnetic radiation-absorptive article as set forth in claim 1 in which said powdered carbon is a mixture of graphite and semi-reinforcing furnace black.

References Cited in the file of this patent

UNITED STATES PATENTS

| | | |
|---|---|---|
| 1,696,411 | Peck | Dec. 25, 1928 |
| 2,239,414 | Eddison | Apr. 22, 1941 |
| 2,332,196 | Bjorksten | Oct. 19, 1943 |
| 2,335,958 | Parker | Dec. 7, 1943 |
| 2,349,440 | Lavoie | May 23, 1944 |
| 2,436,578 | Korn et al. | Feb. 24, 1948 |
| 2,464,006 | Tiley | Mar. 8, 1949 |

FOREIGN PATENTS

| | | |
|---|---|---|
| 423,876 | Great Britain | Feb. 11, 1935 |
| 22,711 | Australia | May 21, 1935 |
| 802,728 | France | June 13, 1936 |